INVENTOR
Joseph A. Levendusky
ATTORNEYS

3,200,067
CONTINUOUS LIQUID-SOLID CONTACT PROCESS

Joseph A. Levendusky, Bayonne, N.J., assignor to Union Tank Car Company, Chicago, Ill.
Filed Oct. 30, 1962, Ser. No. 234,122
7 Claims. (Cl. 210—24)

This invention relates to the art of treating a liquid by passing it through a confined bed of discrete particles so that the contact of the particles with the liquid effects the required treating thereof. More particularly the invention relates to the method of treating a liquid by flowing untreated liquid under pressure and in an upward direction through a bed of treating material and intermittently replenishing the supply of treating material as it becomes spent or exhausted while at the same time controlling the flow of untreated liquid entering the bed in such a manner that the volume of the effluent exiting from the bed remains the same at all times.

Generally, liquids may be treated by two types of contact processes; one involves the use of a material which absorbs certain particulate matter contained in the liquid as it is passed therethrough and the other involves the use of an ion exchange material which acts to remove certain ions contained in the liquid and replace them with the ions of the exchange material.

With either process, a treating tank is provided and filled with a bed of treating material. The liquid to be treated is then passed through the bed and collected as it exits therefrom and the contact of the particles of the bed with the liquid removes the undesirable impurity from the liquid. After a period of time of what is termed the normal operating step, however, the particles in the bed become exhausted or spent and are less capable of removing the impurities from the liquid. It is therefore necessary to replenish the bed with fresh or regenerated treating material when this occurs. In beds where the liquid is passed through in an upward direction, the material at the lower end of the bed becomes exhausted before the material located at the upper end since the liquid by the time it reaches the upper portion of the bed has been partially purified.

With prior methods of treating liquids, fresh treating material is intermittently added and the most exhausted material removed and the flow of the liquid through the exchange material is diverted from its normal output direction and flows, instead, with the exhausted material as it is removed from the bed. Since this flow of liquid is being diverted during the replenishing step, the volume of purified liquid exiting from the bed during this time is greatly reduced or completely stopped.

A further characteristic of prior methods of treating liquids by the liquid-contact process involves the change in degree of purification of the effluent exiting from the treating tank after each replenishing operation. As stated above, the procedure employed to provide room for the addition of treating material as the old material became exhausted included a diversion of the flow of incoming untreated liquid from its normal output direction to a point located at the bottom of the bed through which the spent material was adapted to pass. This diversion of the liquid produced a slurry in the under portion of the bed and thereby undercut the bed. Undercutting and removing this portion of the bed permitted the remaining portion of the bed to fall within the treating tank so that fresh material could be added at its upper end. With this procedure, however, the degree of exhaustion of the different cross-sectional areas of the bed was not maintained constant throughout such areas. This is so since the bed when dropping to a lower level was not positively controlled and merely fell by gravity thereby permitting the material located in the center of the bed to drop before the material located at the edges since the particles at the edges tended to be supported by their frictional engagement with the walls of the tank. When fresh treating material was subsequently added to the top of the bed, the majority thereof was deposited in the center of the bed while the edges thereof remained made up of partially exhausted material. Similarly, the degree of exhaustion of the cross-sectional area of the bed at its lower end changed, with the particles around the edge showing a greater degree of exhaustion than the particles located at the center thereof. Liquid passing through the bed after the replenishing step was therefore contacted by a bed having changed characteristics and exited from the bed with a corresponding changed degree of purification.

With applicant's method of treating liquids as taught by the present invention, the volume of purified or treated liquid exiting from the treating bed is kept constant during both the normal operating step and the replenishing step by controlling the flow of untreated liquid entering the bed during the replenishing cycle. In addition to keeping the volume of the effluent constant it is also an object of the present invention to keep its degree of purification uniform and this is effected by adding the fresh treating material under pressure while partially restraining movement of the exhausted material out of the bed so as to maintain the bed in a compacted condition.

The invention is more clearly defined in the following specification and accompanying drawings of which:

Figure 1:
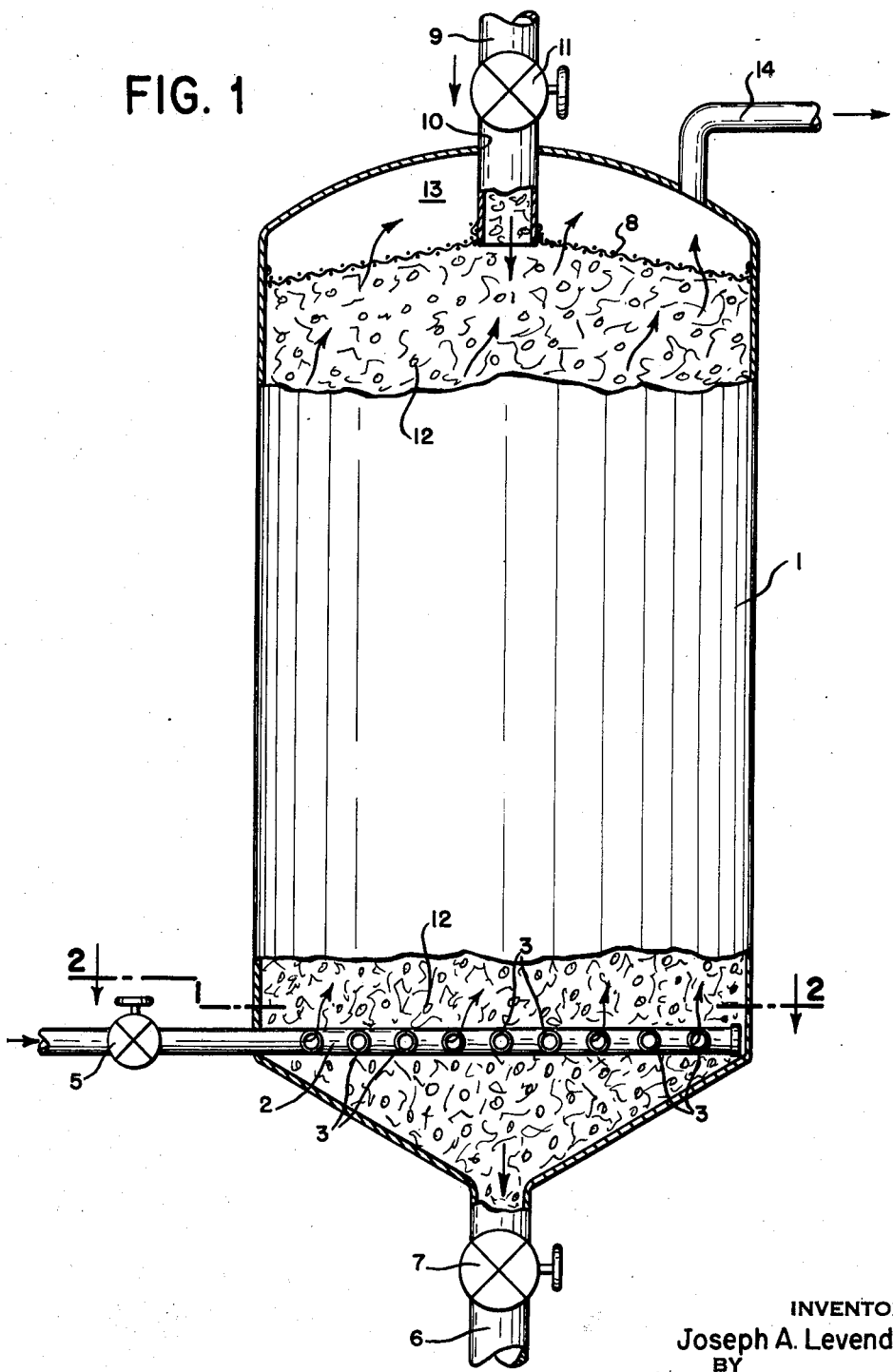
FIG. 1 is a sectional elevation of treating tank showing the disposition of the internal parts in relation to the compacted bed.
Figure 2:
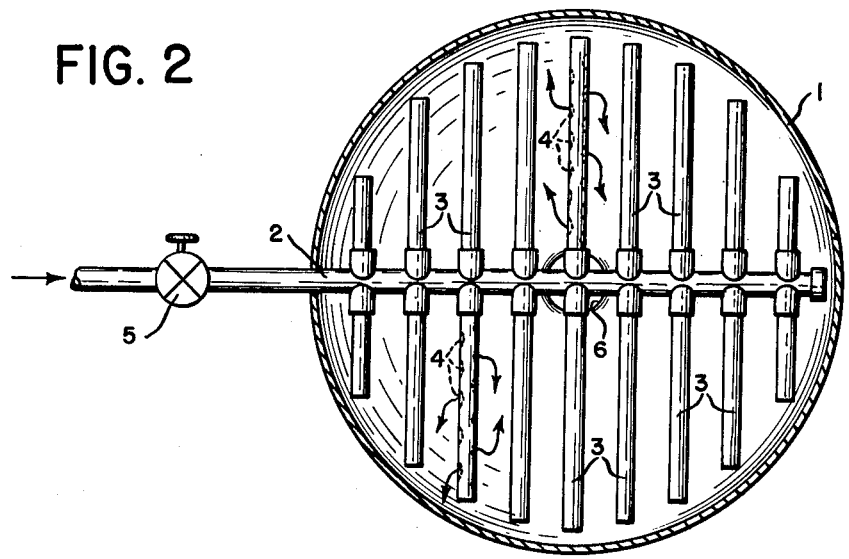
FIG. 2 is a plan view of the distributor shown in FIG. 1.

Referring to FIGS. 1 and 2, there is shown a treating tank 1. Disposed within the tank at its lower end is a distributor comprising a header 2 and laterals 3 which, in turn, are provided with orifices 4. The distributor extends through the side wall of the tank and is adapted to be connected to a suitable source of untreated liquid. As shown, the distributor is provided with a control valve 5 for controlling the flow of liquid into the treating tank. The lower end of the tank extending below the distributor is cone shaped and provided with an outlet 6 and cooperating outlet valve 7 at its apex. Adjacent the upper end of the tank there is provided a retaining screen 8 of such construction that liquid but not the particles of the treating materials may pass therethrough. This screen has a periphery which conforms substantially to that of the tank and is provided in the center thereof with an inlet pipe 9 which extends through an opening 10 in the upper end of the tank. The inlet pipe 9 is provided with a valve 11 for controlling the flow of treating material 12 into the tank; and as shown, the tank is filled to the level of the retaining screen with a suitable treating material. The space defined by the retaining screen and the top of the tank provides a collecting chamber 13 which communicates with the exterior of the tank via a product outlet pipe 14.

Figure 3:
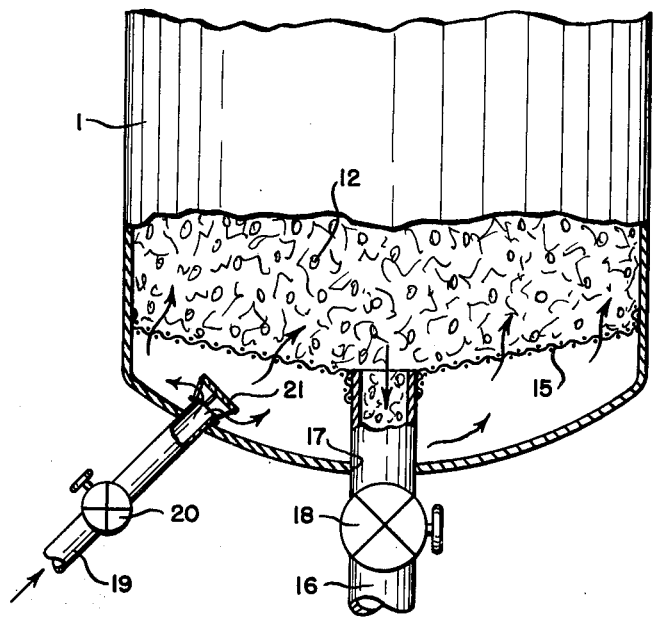
FIG. 3 is a view showing a modified form of the invention.

FIG. 3 shows a modified construction of the treating tank wherein the distributor of FIGS. 1 and 2 is replaced by a conically shaped screen 15 for supporting the entire bed. The screen is constructed in such a manner that water but not the particles of treating material may pass therethrough; and as shown, it may be the same as the retaining screen 8 of FIG. 1. This supporting screen is provided with an outlet pipe 16 which extends through an opening 17 in the lower end of the tank. An outlet valve 18 which may be of the same construction as valve 7 of FIG. 1 is provided for controlling the flow of spent treating material out of the tank. Below the screen 15 there is disposed a liquid inlet pipe 19 which is provided with a control valve 20. In front of this pipe there may be positioned a baffle for diverting the flow of incoming liquid so that it does not tend to pass through the supporting screen at only one point and this is shown at 21 in FIG. 3.

In operation, the valve 7 is closed and the inlet valve 11 is opened and discrete particles of a treating material 12 are introduced under pressure through the inlet pipe 9 until the tank is filled with compacted material to the level of the retaining screen 8. In the form of the invention shown in FIG. 1, the portion of the bed located above the distributor 2 will tend to become more compacted than the portion disposed below. The distributor forms an intermediate support for the bed and due to the area which it occupies, it will diminish the force exerted on the treating material located below it. In the form of the invention shown in FIG. 3, the entire bed will become compacted substantially uniformly throughout.

The valve 11 is now closed and an untreated liquid from which undesirable impurities are to be removed is fed under a predetermined pressure and in a predetermined volume into the bed. As the content of the liquid in the tank increases, it will pass through the bed and exit in the form of a purified effluent through the retaining screen 8 into the collecting chamber 13 from where it passes through the top of the tank via the product outlet pipe 14. It is noted that the liquid must pass through the screen in order to get into the collecting chamber. Thus, it is assured that no treating material will be contained in the liquid exiting through the outlet pipe 14.

After a sufficient period of time, the bed 12 tends to become spent or exhausted with the material near the bottom of the column showing the greatest degree of exhaustion. To replenish the material, outlet valve 7 of FIG. 1 or outlet valve 18 of FIG. 3 and inlet valve 11 are opened simultaneously and fresh material is introduced under pressure through the inlet pipe 9 so as to simultaneously force the most exhausted material out through resin outlet pipe. It is important that the fresh material be introduced at a sufficient rate so that the exhausted material is forced out of the bed rather than allowed to drop by gravity so that the bed is maintained in its original compacted condition. When the outlet valve is opened, the flow of untreated liquid will be diverted through the outlet pipe thereby tending to interrupt the flow of the effluent from the product outlet pipe 14. In order to maintain the flow of effluent from the outlet pipe at a volume equal to that flowing therethrough during the normal treating operation, the control valve 5 is opened to a wider position than normal thereby increasing the flow of liquid entering the bed. By increasing the flow of liquid entering the tank and by increasing the force with which it enters, it is possible to maintain the normal flow of effluent through the outlet pipe 14 during the replenishing cycle. After a sufficient amount of new resin has been introduced, both the inlet and outlet valves are closed and control valve 5 is returned to its original position. Suitable means may be provided for automatically opening and closing the various valves at the proper time and for varying the opening of the control valve 5.

During the replenishing step, the simultaneous withdrawal of material and the introduction of new material under pressure maintains the working portion of the bed in substantially compacted condition so that the bed as a whole will be moved downwardly and there will be no undesirable dropping of the middle portion to change the degree of exhaustion of any particular cross-sectional area. The degree of compactness may be controlled by controlling the extent to which the inlet and outlet valves are opened. As long as the outlet valve is opened to a lesser extent than the inlet valve, the spent particles will be forced rather than dropped out the tank through the outlet pipe.

With reference to FIG. 1, the area of the bed located below the distributor tends to form into a slurry during the replenishing cycle since it is not kept in as compacted a state as the portion of the bed located above the distributor. This, however, will not affect the uniformity of the effluent exiting through the product outlet pipe 14 since the critical or actual working portion of the bed through which the liquid flows in this arrangement is located above the distributor and this part is always maintained in a compacted condition.

It is to be understood that the invention described above is applicable to various situations where it is desired to treat a particular liquid by passing it through a bed of discrete particles so that the liquid is contacted thereby. Accordingly, reference should be made to the following appended claims in determining the full scope of the invention.

I claim:
1. In the process of treating a liquid comprising:
(A) confining a bed of liquid treating particles so that said bed is motionless,
(B) passing an untreated liquid through said motionless bed at a predetermined flow rate,
(C) recovering all liquid that has passed through said motionless bed so as to provide a constant volume of treated liquid, and then
(D) after sufficient liquid has passed through said motionless bed to render the treating action of said particles less effective, moving said bed during intermittent periods so as to replace the most exhausted particles thereof with fresh particles, a quantity of said untreated liquid moving with said most exhausted particles so as to bypass said bed,
the improved method of continuously providing said constant volume of treated liquid comprising the step of:
automatically increasing the volume of untreated liquid introduced into said bed during said intermittent periods by an amount equal to said quantity moving with said most exhausted particles so that said constant volume of treated liquid continues to be recovered.

2. In the process of treating a liquid comprising:
(A) confining a bed of liquid treating particles so that said bed is motionless,
(B) passing an untreated liquid through said motionless bed at a predetermined flow rate,
(C) recovering a constant volume of treated liquid after passage through said motionless bed, and then
(D) after sufficient liquid has passed through said motionless bed to render the treating action of said particles less effective, moving said bed during intermittent periods so as to replace the most exhausted particles thereof with fresh particles,
the improved method of continuously providing said constant volume of treated liquid comprising the steps of:
(1) increasing the volume of untreated liquid introduced into said bed during said intermittent period until said constant volume of treated liquid continues to be recovered, and
(2) exiting excess liquid with said replaced particles.

3. In the process of treating a liquid comprising,
(A) passing the liquid in only countercurrent flow through a vertical bed of unexpanded, mechanically confined, packed, granular liquid treating solids, there being valve means above and below said bed, (B) substantially simultaneously opening valve means above and below said bed at intermittent periods to move the solids intermittently in the form of a slug, and (C) during said intermittent periods, adding an additional quantity of the said solids to the bed, and (D) then closing said valve means, the improved method of providing a constant volume of treated liquid comprising the steps of:

(1) opening valve means so as to increase the volume of untreated liquid flowing into said bed during said intermittent periods to maintain the treated liquid flow at said constant volume, and (2) passing excess liquid entering said bed during said intermittent periods out with said solids moved as a slug.

4. In the process of treating a liquid comprising, (A) passing the liquid in only countercurrent flow through a bed of unexpanded, mechanically confined, packed, granular liquid treating solids, there being particle restraining means at each end of said bed, (B) substantially simultaneously opening such particle restraining means at each end of said bed at intermittent periods to move the solids intermittently in the form of a slug, and (C) during said intermittent periods, adding an additional quantity of the said solids to the bed, and (D) then closing said particle restraining means, the improved method of providing a constant volume of treated liquid comprising the steps of:

(1) automatically increasing the volume of untreated liquid flowing into said bed during said intermittent periods to maintain the treated liquid flow at said constant volume, and (2) passing excess liquid entering said bed during said intermittent periods out with said solids moved as a slug.

5. In the process of treating a liquid to a uniform purity comprising:

(A) confining and compacting a bed of discrete impurity removing particles, (B) introducing an untreated liquid under a predetermined pressure into said bed at one location, (C) flowing said liquid through said bed so that it exits therefrom at a predetermined rate at a different location, (D) intermittently removing the portion of said bed first contacted by the liquid after an adequate amount of liquid has passed therethrough so as to render the treating action of the particles less effective, (E) replenishing said bed by introducing under pressure fresh particles at the location where the treated liquid exits therefrom and in a direction opposite said flow of liquid, and (F) maintaining the bed in a compacted condition during the entire process, the improved method of providing a constant volume of said uniform purity liquid comprising the steps of:

(1) increasing the volume of untreated liquid introduced into said bed during said removing and replenishing steps so that the treated liquid continues to exit at said predetermined rate, and (2) passing the excess liquid entering the bed during step (1) out of the bed with the removed portion.

6. In the process of treating a liquid to a uniform purity comprising:

(A) confining and compacting a bed of discrete impurity removing particles, (B) introducing an untreated liquid under a predetermined pressure into said bed at one location, (C) flowing said liquid through said bed so that it exits therefrom at a predetermined rate at a different location, (D) intermittently removing the portion of said bed first contacted by the liquid after an adequate amount of liquid has passed therethrough so as to render the treating action of the particles less effective, (E) simultaneously with (D) replenishing said bed by introducing under pressure fresh particles at the location where the treated liquid exits therefrom and in a direction opposite said flow of liquid, and (F) maintaining the bed in a compacted condition during the entire process, the improved method of providing a constant volume of said uniform purity liquid comprising the steps of:

(1) increasing the volume of untreated liquid introduced into said bed during said simultaneous removing and replenishing steps so that the treated liquid continues to exit at said predetermined rate, and (2) passing the excess liquid entering the bed during step (1) out of the bed with the portion of the bed first contacted thereby.

7. In the process of treating a liquid to a uniform purity comprising:

(A) confining and compacting a bed of discrete impurity-removing particles, (B) introducing an untreated liquid upwardly under a predetermined pressure into the lower end of said bed, (C) flowing said liquid through said bed so that it exits from the upper end of the bed at a predetermined rate, (D) intermittently removing the lowermost portion of said bed after an adequate amount of liquid has passed therethrough so as to render the treating action of the particles less effective, (E) simultaneously with (D) replenishing said bed by mechanically pushing fresh particles from above the bed in a downward direction, and (F) maintaining the bed in a compacted condition during the entire process, the improved method of providing a constant volume of said uniform purity liquid comprising the steps of:

(1) increasing the volume of untreated liquid introduced into said bed during said simultaneous removing and replenishing steps so that the treated liquid continues to exit from the upper end of said bed at said predetermined rate, and (2) passing the excess liquid entering the bed during step (1) out of bed with said lowermost portion.

References Cited by the Examiner

UNITED STATES PATENTS

| | | | |
|---|---|---|---|
| 329,331 | 10/85 | Matthiessen | 127—55 |
| 2,973,319 | 2/61 | Porter | 210—33 |
| 3,072,567 | 1/63 | Evans et al. | 127—46 |

MORRIS O. WOLK, *Primary Examiner.*